Dec. 25, 1956   W. F. SWINGLER   2,775,465
PORTABLE CART

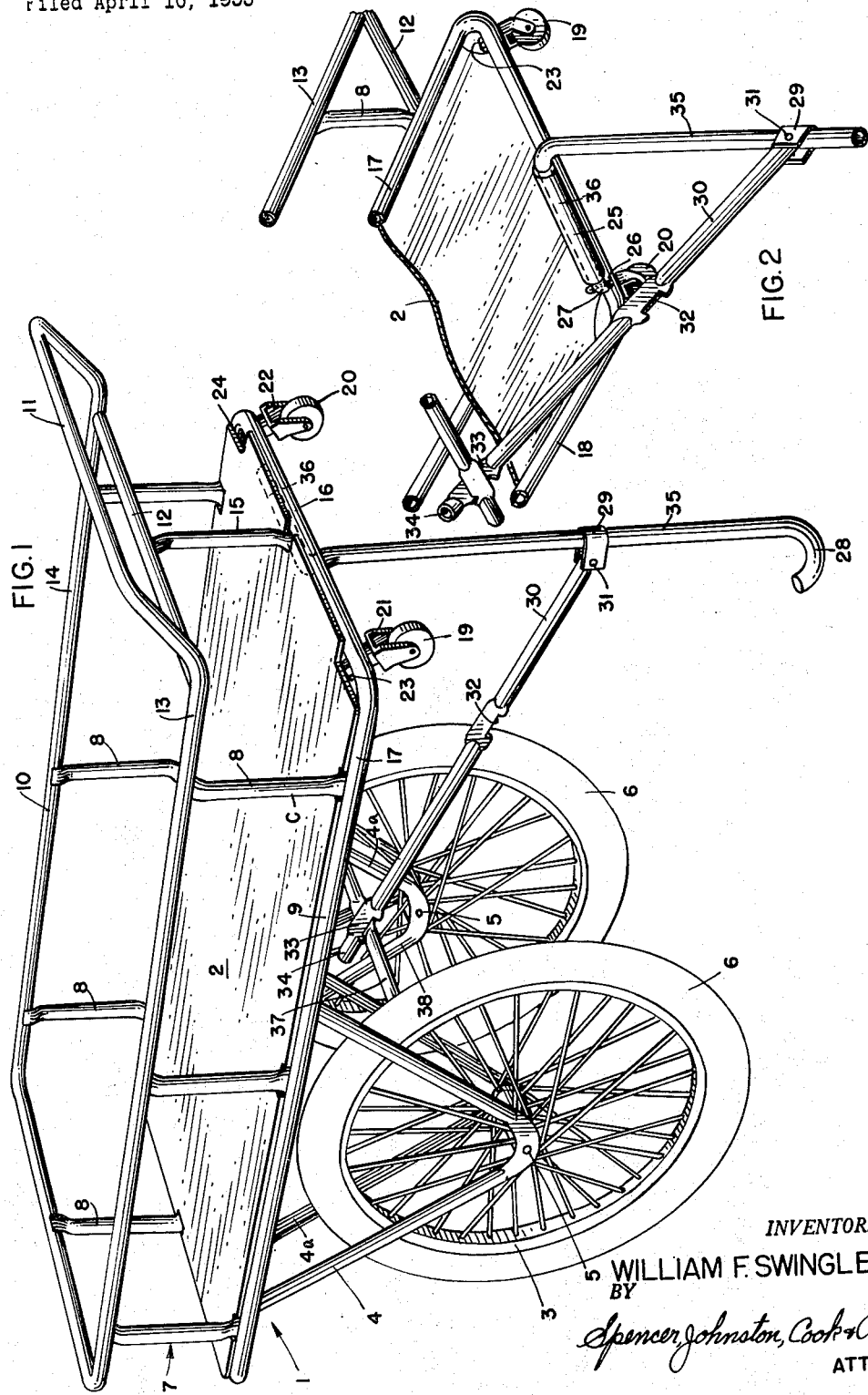

Filed April 10, 1953   2 Sheets-Sheet 2

INVENTOR:
WILLIAM F. SWINGLER
BY
Spencer Johnston, Cook & Root.
ATT'YS.

United States Patent Office 2,775,465
Patented Dec. 25, 1956

2,775,465
PORTABLE CART

William F. Swingler, Chicago, Ill., assignor to Automatic Canteen Company of America, Chicago, Ill., a corporation of Delaware Application April 10, 1953, Serial No. 347,989

1 Claim. (Cl. 280—47.2)

This invention relates to a portable cart and more particularly to a cart of tubular construction that may be readily transported from one situs to another.

The cart that comprises this invention is light in weight, being designed particularly for use by delivery men as an auxiliary implement to delivery operations. The chart is of simple construction and yet is sufficiently sturdy that it may be used to transport quantities of goods, supplies and other merchandise from point to point at a local situs. A set of main wheels as well as a pair of auxiliary wheels is provided. The latter are of such size that the cart may be elevated to the platform of a delivery truck for which the cart is designed as standard auxiliary equipment to expedite delivery operations at a given situs, so that the cart per se may be transported from the local situs to one at a distance and not conveniently within walking range.

When the cart is in operation a tray portion of the cart is maintained in a level or horizontal position and rests upon the main wheels. The level position of operation is effected by a front support vertically maintained by a link adjustably secured to a bar located between the main wheels. The front support is pivotally mounted upon a portion of the cart platform supporting framework.

The cart is "portable" in the sense that when adjusted it may be readily elevated from one plane to another such as from the ground or pavement level to a truck or dock surface. By adjusting the link and pivoting the front support, the cart is caused to rest upon the auxiliary wheels as well as the main wheels. When the main and the auxiliary wheels thus lie in the same plane, the tray, unlike its level operative position, is angularly disposed with respect to the surface upon which the wheels rest. The degree of angularity of the tray is then approximately 45° and when so angularly positioned, the front support lies substantially parallel to the supporting surface. Transporting the cart involves the adjustment of the link and pivoting of the support as described, and thereafter elevating the auxiliary wheels so as to rest upon a surface to which it is desired to elevate the cart. By lifting one end of the cart so that its weight is upon the auxiliary wheels, the main wheels may be elevated to the plane of the auxiliary wheels supporting surface. Moving the cart upon the auxiliary wheels, the main wheels are brought to rest also upon the same surface. The cart is thus easily elevated from its initial support surface to the elevated support surface. The reverse procedure is followed when it is desirable to transport the cart from a supporting surface in a given plane to a surface in a lower plane.

Such a cart is suitable for use by delivery personnel in the vending field, for instance, where it is necessary to handle quantities of merchndise that are to be "loaded" in vending machines, or by milkmen, soft drink vendors or tradespeople or in any of the many situations where it is necessary to transport merchandise, tools and the like from one place to another in a given building or plant, or from one building to another. The cart eliminates the necessitity of carrying heavy loads by hand and of trips back and forth from multiple local distribution points or work situations to the supply truck or van in providing a convenient means for transporting a quantity of merchandise that would otherwise have to be carried by the delivery personnel.

An object of the invention is the provision of a cart that is light in weight and of simple construction perrmitting the ready distribution of items that are loaded upon the cart and means for easily transporting the cart from one location to a location at a point distant necessitating the use of an intermediate transporting vehicle.

Another object of the invention is the provision of a lightweight cart having a set of auxiliary wheels enabling the facilitated transportation of the cart from one location to another location.

A still further object of the invention is the provision of a lightweight cart having a tubular framework with a collapsible front support structure facilitating the elevation or lowering of the cart from one plane to another.

A further object of the invention is the provision of a lightweight cart having a set of main wheels and an auxiliary set of wheels adjacent the handle of the cart whereby the vehicle may readily be loaded upon a delivery van.

A still further object of the invention is the provision of a lightweight cart having a tray portion at a height that is substantially in the same level as the platform of an automotive vehicle such as a truck and a pair of casters adjacent the handle portion of the cart whereby the cart may be easily elevated to the vehicle platform by pivoting the cart upon the casters and rolling the cart thereon.

Other objects and advantages of the invention will become apparent upon reading the following description taken in conjunction with the accompanying drawings in which:

Fig. 1 is a perspective view of the cart comprising the invention;

Fig. 2 is a fragmentary perspective view of the under portion of the front end of the cart framework, and showing the means for mounting the front support to the framework and the recesses in the link;

Figure 3:
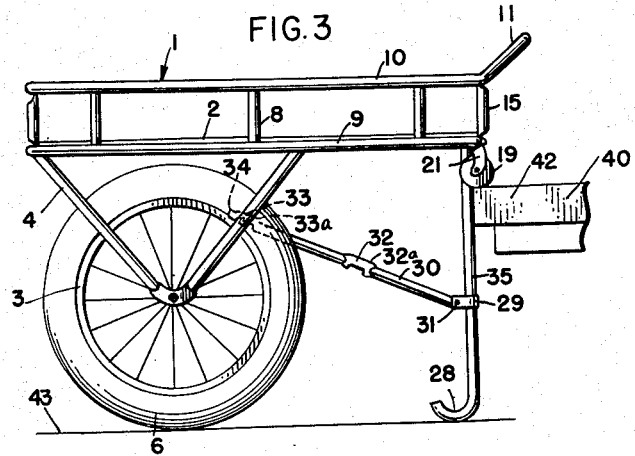
Fig. 3 is a side elevational view showing the front support member with casters disposed beneath one end of the cart tray resting upon a surface to which the cart is to be elevated.

The cart that constitutes this invention as seen from Fig. 1, is comprised of an article supporting structure generally indicated at 1 mounted upon main wheels such as 3 by means of the outer V-shaped supports 4 and the inner V-shaped supports 4a. The wheels 3 are supported upon the axle such as 5 located between the apex of the supports 4 and 4a and each have mounted thereon a rubber tire 6.

The support structure is comprised of a generally rectangular tubular framework 7 and a platform 2. The framework 7 is comprised of a platform support 9 and a guard rail 10. Disposed between the platform support 9 and the guard rail 10 at spaced apart points is a series of vertical connecting bars 8. The guard rail 10 is bent upwardly at one end to define a handle 11 and substantially at the point where the handle bend occurs, a horizontally disposed reinforcing bar 12 is provided that connects the sides 13 and 14 of the guard rail. The bar 15 connected to the bar 12 and the front portion 16 together with the bars 8 serve to maintain the platform support 9 and guard rail 10 in rigid, spaced apart relationship.

Secured to the front portion 16 of the platform support 9, one each adjacent the side portions 17 and 18 of the framework, are auxiliary wheels or casters 19 and 20 respectively. The auxiliary wheels are secured to the front portion by means of conventional brackets 21 and 22, the stems of which each penetrate an opening in the framework, and are threaded endwise to receive nuts 23 and 24.

A tubular support member 35 is provided with an arm 36 that is received by the sleeve 25 secured to the front portion 16 of the platform support 9 (Fig. 2). The arm 36 is pivotally secured within the sleeve 25 by means of the cotter pin 26 located in the end 27 of the arm. The other end of the front support member 35 is generally curved to provide a foot 28 that extends outwardly from the arm 36 at a right angle and parallel to the wheels.

A generally U-shaped bracket 29 is mounted upon the support member 35 and has pivotally secured thereto a tubular link 30. The pivot pin 31 passes through openings in the arms of the bracket 29 and through an opening in the link 30. The pin acts as an axis upon which the link 30 may pivot. The link 30 has a recess 32 formed intermediate the ends thereof and another recess 33 adjacent the outer end thereof. Disposed between the inner V-shaped supports 4a upon the arm 38 of the support 4a is a bar 37 adapted to be received by the recesses 32 and 33 formed in the link 30. The recesses are formed by merely collapsing the walls of the tube that comprises the link in the area wherein the recess is desired. Such collapse results in a double walled flat portion such as 32a and 33a in which the recesses 32 and 33 formed respectively by removing a portion of the double thickness.

Figure 4:
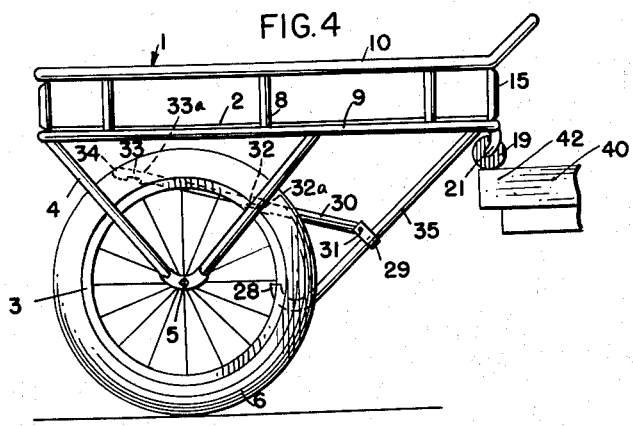
Fig. 4 is a view similar to Fig. 3 wherein the front support has been pivoted from a vertical position so as to become angularly disposed with respect to the cart tray and there maintained by the link connecting the front support to a bar disposed between the wheels.
Figure 5:
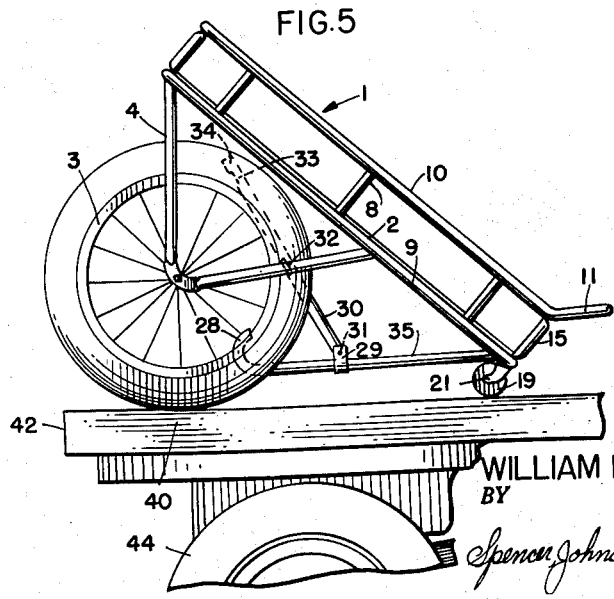
Fig. 5 is a view similar to Fig. 4 of the cart when elevated upon the truck platform.

The operation of the cart in its duo-function as an aid for the distribution of supplies at a given situs and as a conveying mechanism that may be readily transported from a given situs to one far removed from the given situs may be seen in Figs. 3, 4 and 5 wherein a platform 40 appears. Such a platform may be that of a truck as indicated in Fig. 5 where a wheel 44 is depicted, but it may be readily appreciated that such a platform may be the dock upon which goods are received at a loading or unloading area of a given industrial plant, apartment building, factory, school or the like. Fig. 3 shows the front support 35 in an upright position and the auxiliary wheels 19 and 20 resting upon the end portion 42 of the surface of the plaftorm 40. In this position, as in Fig. 1, the end recess 33 engages the bar 37. When the bar and recess are so associated, the tray assumes a level position and consequently the vehicle may be used for transporting merchandise from one point to another at a given location by simply loading merchandise upon and within the tray 1 and wheeling the cart to the desired location. When it is desired to remove the cart to another scene at a point distant, it is relatively easy to effect such transportation. In Fig. 4, the cart is in a position preparatory to raising the cart to the platform elevation shown in Fig. 5. The support member 35 has been swung inwardly of the wheels 3 so that the curved foot 28 of the support member is disposed between the wheels, and the mid-point recess 32 of the link 30 engages the bar 37. By lifting upwardly the end opposite the handle 12 the entire cart may be pivoted upon the auxiliary wheels 19 and 20 and readily elevated to the platform 40. As shown in Fig. 5, the platform 2 then lies substantially at a 45° angle with respect to the platform 40 and the handle as well as the front support member 35 are substantially parallel to the platform. In this position the cart may nevertheless be rolled upon the platform support to a desired position upon the platform. When it is desired to remove the cart from the platform the reverse procedure is followed whereby the wheels 3 are elevated and the entire cart pivoted upon the auxiliary wheels and rolled thereon until they approach the end 42 of the platform. The tray and the main wheels are arcuately swung while pivoted upon the auxiliary wheels until the horizontal position of the supporting structure is attained as shown in Fig. 4 where the main wheels 3 rest upon the pavement level 43 and the auxiliary wheels rest upon the platform end 42. The link 30 is then raised and the support member 35 pivoted to an upright or vertical position so that the end recess 33 engages the bar 37. When the link is so aligned with respect to the bar, the tray is supported in a horizontal position and may be loaded with the goods, distribution of which is desired.

The cart herein described embodies a novel method for transporting the cart between points at a distance whenever it is necessary to truck the cart bodily from one such point to another. Such transportation, as may be seen from the above described characteristics of the cart may be readily accomplished. Being of simple construction and of light weight characteristics, the cart represents a desirable auxiliary tool for tradespeople in delivering various merchandise from point to point at a given location. The cart is easily transported and ready for use and may be laden with quantities of merchandise that heretofore could not be distributed without necessitating many returns to the vehicle in which supplies were brought to the given location. As an auxiliary tool it enhances greater distribution of merchandise with a minimum effort to the personnel to whom such duties of distribution have been assigned.

Changes may be made in the form, construction and arrangement of parts from those disclosed herein without in any way departing from the spirit of the invention or sacrificing any of the attendant advantages thereof, provided, however, that such changes fall within the scope of the claim appended hereto.

The invention is hereby claimed as follows:

A portable two-wheeled hand cart comprising an article supporting structure including a tray portion, a handle portion on said structure, a pair of large wheels disposed towards one end of said cart, a pair of small auxiliary wheels at the other end of said cart and adjacent said tray portion, a supporting leg pivotally mounted adjacent said last-named end centrally thereof and independently of said auxiliary wheels, said leg being mounted for supporting said tray portion in a horizontal position upon said large wheels and for collapsing beneath said tray portion, said auxiliary wheels being adapted with said leg for positioning the auxiliary wheels on a raised loading platform with said leg in its supporting position, said structure being supportable by both of said pairs of wheels in an angular position upon collapsing said leg, a link pivotally secured to said leg for extending beneath said tray portion, and means mounted beneath said tray portion for adjustably securing said link in its positions corresponding respectively to the supporting and collapsed positions of said leg.

References Cited in the file of this patent

UNITED STATES PATENTS

| | | |
|---|---|---|
| 202,868 | Rice | Apr. 23, 1878 |
| 2,565,820 | Mechanic | Aug. 28, 1951 |
| 2,628,108 | Rutledge | Feb. 10, 1953 |